United States Patent
Minaguchi et al.

(10) Patent No.: US 7,164,577 B2
(45) Date of Patent: Jan. 16, 2007

(54) ELECTRONIC APPARATUS HAVING STORAGE DEVICE

(75) Inventors: Hiroyuki Minaguchi, Higashimatsuyama (JP); Hidemi Itakura, Nishitama-gun (JP); Takayuki Arisaka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/995,071

(22) Filed: Nov. 23, 2004

(65) Prior Publication Data

US 2005/0111202 A1 May 26, 2005

(30) Foreign Application Priority Data

Nov. 26, 2003 (JP) .............................. 2003-396022

(51) Int. Cl.
*G06F 1/16* (2006.01)
*G06F 13/00* (2006.01)

(52) U.S. Cl. ...................... 361/683; 361/685; 710/303; 312/351.2

(58) Field of Classification Search ........ 361/679–687, 361/724–727; 248/694; 710/303; 174/113 R; 312/351.2; 707/3; 348/460
See application file for complete search history.

(56) References Cited

U.S. PATENT DOCUMENTS

| 5,402,308 A | 3/1995 | Koyanagi et al. |
| 6,283,438 B1 * | 9/2001 | Shimada et al. ............ 248/694 |
| 2005/0188142 A1 * | 8/2005 | Nakajima ................... 710/303 |

FOREIGN PATENT DOCUMENTS

| CN | 1403889 A | 3/2003 |
| JP | 10-144066 | 5/1998 |

OTHER PUBLICATIONS

Chinese Office Action dated Jun. 14, 2006 for Appln. No. 200410097303.6.

* cited by examiner

*Primary Examiner*—Hung Van Duong
(74) *Attorney, Agent, or Firm*—Pillsbury Winthrop Shaw Pittman, LLP

(57) ABSTRACT

An electronic apparatus includes a housing, a case, a storage device, and a cable. The housing has a bottom wall and convex portions projecting upward from the bottom wall. The case has a top wall and is accommodated inside the housing while being supported by the convex portions. The storage device is supported by the case. The cable has a connector connected to the storage device. Gaps are formed between the bottom wall of the housing and the storage device and between the top wall of the case and the storage device, respectively. The cable passes through the gap.

9 Claims, 5 Drawing Sheets

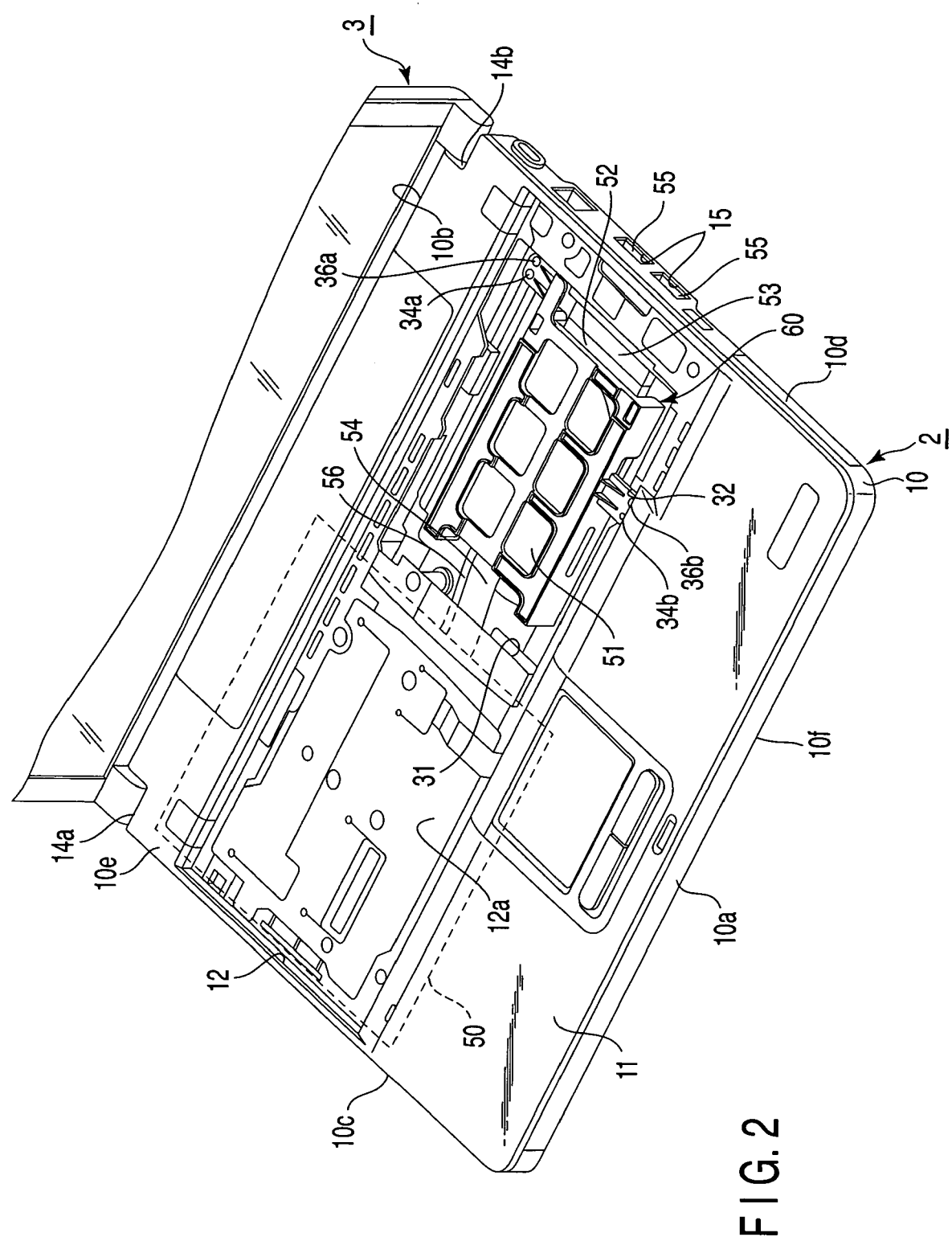
F I G. 2

ELECTRONIC APPARATUS HAVING STORAGE DEVICE

CROSS-REFERENCE TO RELATED APPLICATIONS

This application is based upon and claims the benefit of priority from prior Japanese Patent Application No. 2003-396022, filed Nov. 26, 2003, the entire contents of which are incorporated herein by reference.

BACKGROUND OF THE INVENTION

1. Field of the Invention

The present invention relates to an electronic apparatus such as a portable computer which comprises a storage device.

2. Description of the Related Art

A terminal apparatus such as a POS (Point Of Sale) terminal is disclosed in Jpn. Pat. Appln. KOKAI Publication No. 10-144066. A storage device is mounted in this terminal apparatus so as to be attached to a frame composed of a flexible member such as resin. A base plate is provided inside the terminal apparatus. The frame is attached to the base plate by inserting a part of the frame into a hole formed in the base plate. The storage device is mounted on the frame.

On the other hand, the storage device is accommodated inside the electronic apparatus so as to be electrically connected to a control section such as a printed circuit board. In this case, a connector electrically connected to the control section is pre-fixed to an area in which the storage device is to be placed. Then, at the same time when the storage device is accommodated in the electronic apparatus, the storage device and the connector are mechanically and electrically connected together. Thus, the storage device and the connector are desired to be very accurately positioned. Therefore, in the conventional electronic apparatus, it is difficult to align the storage device and the connector with each other.

BRIEF SUMMARY OF THE INVENTION

According to an embodiment of the present invention, there is provided an electronic apparatus comprises:

a housing having a bottom wall and convex portions projecting upward from the bottom wall;

a case having a top wall and accommodated inside the housing while being supported by the convex portions;

a storage device supported by the case; and a cable having a connector connected to the storage device, wherein gaps are formed between the bottom wall of the housing and the storage device and between the top wall of the case and the storage device, respectively, and the cable passes through the gap between the bottom wall of the housing and the storage device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a perspective view showing a main unit provided in the portable computer in FIG. 1 with a keyboard removed;

DETAILED DESCRIPTION OF THE INVENTION

Figure 1:
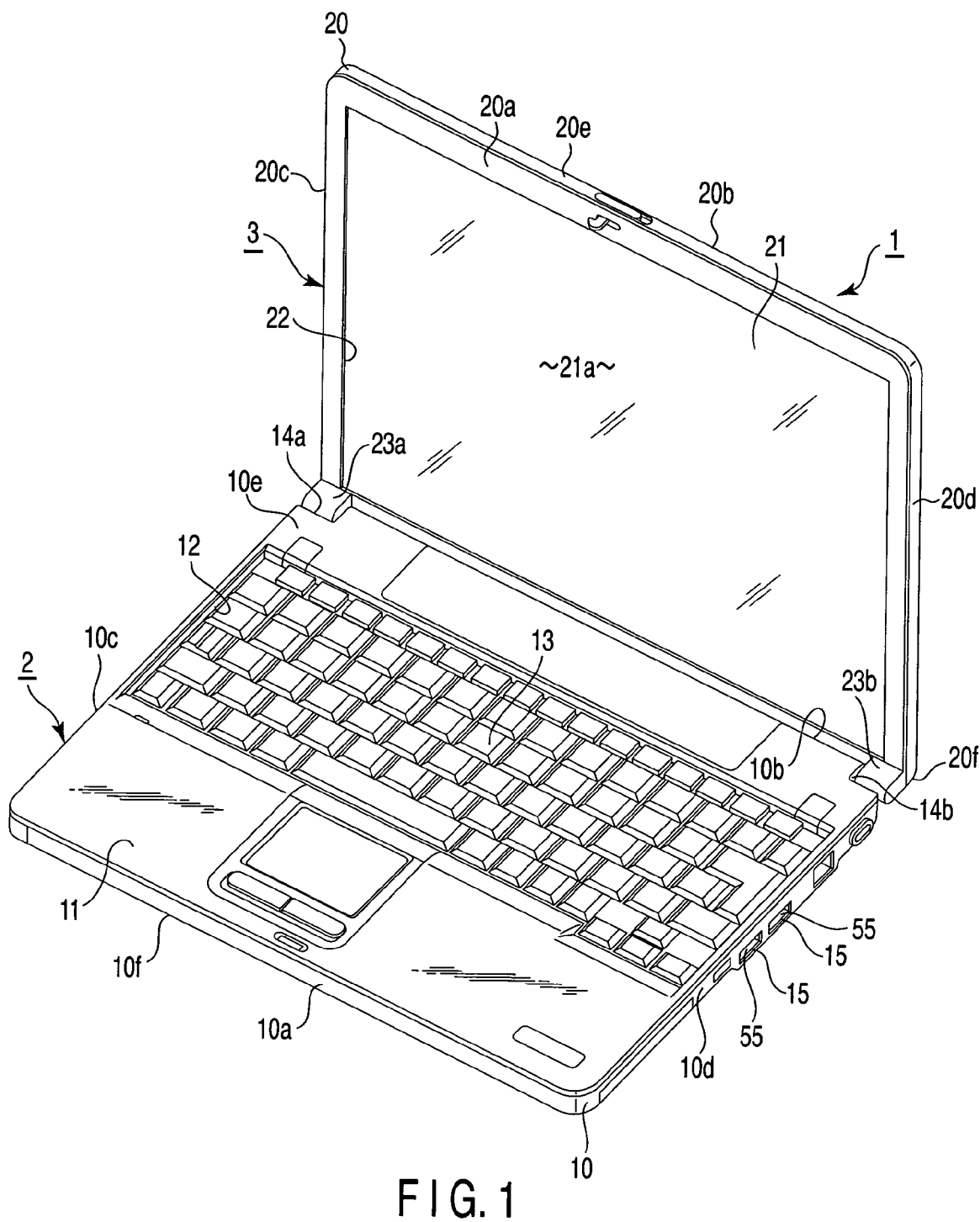
FIG. 1 is a perspective view showing a portable computer according to an embodiment of the present invention.

An embodiment of the present invention will be described below with reference to FIGS. 1 to 8 in which the present invention is applied to a portable computer as an electronic apparatus. FIG. 1 discloses a note-book type portable computer 1. The portable computer 1 comprises a main unit 2 and a display unit 3.

As shown in FIG. 1, the main unit 2 has a first housing 10. The first housing 10 can be installed on an installation surface (not shown), for example, a top plate of a desk. The first housing 10 is shaped like a flat box having a front wall 10a, a rear wall 10b located opposite the front wall 10a, paired side walls 10c and 10d, a top wall 10e, and a bottom wall 10f located opposite the top wall 10e. The top wall 10e has a palm rest 11 and a keyboard attaching portion 12. The palm rest 11 extends along a width direction of the first housing 10 in a front half of the first housing 10. The keyboard attaching portion 12 is located behind the palm rest 11. A keyboard 13 is attached to the keyboard attaching portion 12.

The first housing 10 has paired display supporting portions 14a and 14b located behind the keyboard 13 and spaced from each other in the width direction of the housing 10. The display supporting portions 14a and 14b are composed of concaves formed by cutting out corner portions at a rear end of the first housing 10.

The display unit 3 comprises a second housing 20 and a liquid crystal display device 21 accommodated inside the second housing 20 as a display device. The second housing 20 is shaped like a flat box having a front wall 20a, a rear wall 20b located opposite the front wall 20a, paired side walls 20c and 20d, and paired end walls 20e and 20f. An opening 22 for display is formed in the front wall 20a. The opening 22 is sized to cover most of the front wall 20a. A display screen 21a of the liquid crystal display device 21 is exposed from the second housing 20 through the opening 22.

The second housing 20 has paired leg portions 23a and 23b at one end (a lower end in an open position, described later). The leg portions 23a and 23b are spaced from each other in the width direction of the second housing 20. The leg portions 23a and 23b are guided by the display supporting portions 14a and 14b. The leg portions 23a and 23b are supported at a rear end of the first housing 10 so as to be rotatively movable via hinges (not shown).

Thus, the display unit 3 can be rotatively moved between a closed position in which the display unit 3 is brought down so as to cover the palm rest 11 and the keyboard 13 from above and the open position in which the display unit 3 is stood up so as to expose the palm rest 11 and the keyboard 13.

Figure 3:
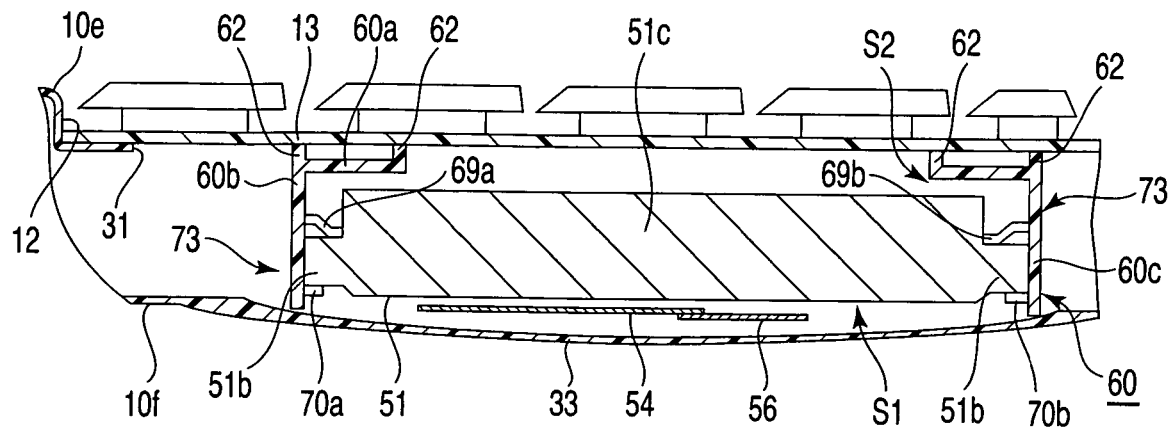
FIG. 3 is a sectional view showing a part of the main unit provided in the portable computer in FIG. 1.
Figure 4:
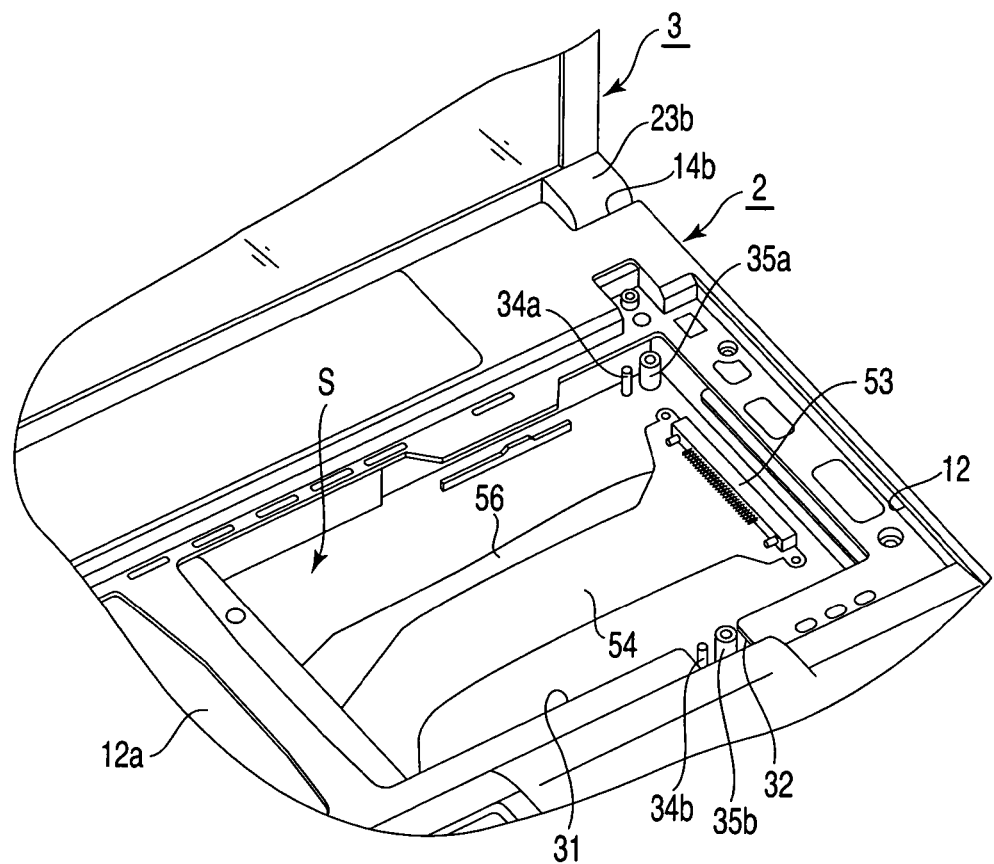
FIG. 4 is a perspective view showing a part of the main unit provided in the portable computer in FIG. 1 with the keyboard, an HDD, and a case removed.

As shown in FIGS. 2 to 4, the keyboard attaching portion 12 is formed like a concave and has a bottom portion 12a. The bottom portion 12a of the keyboard attaching portion 12 is formed with an opening 31 located closer to one 10d of the side walls, and a notch portion 32 that connect to a front edge of the opening 31. The opening 31 forms a space S (see FIG. 4) that accommodates a hard disk drive 51, described later. Specifically, the opening 31 serves to increase the size of the space S by an amount corresponding to the thickness of the bottom portion 12a. The notch portion 32 allows a second convex portion 34b and a second boss 35b, both described later, to be exposed when the keyboard 13 is removed.

As shown in FIG. 3, the bottom wall 10f of the first housing 10 has a bent portion 33 in an area located opposite the opening 31, the bent portion 33 projecting downward. Further, as shown in FIG. 4, a first and second convex portions 34a and 34b and a first and second bosses 35a and 35b project upward from an inner surface of the bottom wall 10f. The convex portions 34a and 34b and the bosses 35a and 35b are provided at positions corresponding to an edge of the opening 31 and the notch portion 32.

Specifically, the first boss 35a is provided adjacent to the first convex portion 34a. The second boss 35b is provided adjacent to the second convex portion 34b. The first convex portion 34a and the first boss 35a are provided at the position corresponding to the rear edge of the opening 31. The first convex portion 34a and the first boss 35a are exposed via the opening 31 when the keyboard 13 is removed. The second convex portion 34b and the second boss 35b are provided at the position corresponding to the notch portion 32. The second convex portion 34b and the second boss 35b are exposed via the notch portion 32 when the keyboard 13 is removed.

The main unit 2 comprises a printed circuit board 50 operating as a control section, a hard disk drive (hereinafter referred to as an HDD) 51 as a storage device, a first connector 53 connected to the HDD 51, a first cable 54 connected to the first connector 53, a second connector 55 such as a USB connector which electrically connects an expansion apparatus (not shown) to the printed circuit board 50, a second cable 56 connected to the second connector 55, a floppy disk (registered trade mark) drive (not shown), and the like.

The printed circuit board 50 is placed, for example, below the keyboard 13 and closer to the other side wall 10c. The printed circuit board 50 is screwed to the bottom wall 10f of the first housing 10. That is, the printed circuit board 50 is covered with the bottom portion 12a of the keyboard attaching portion 12.

The HDD 51 is, for example, 1.8 inches in size and 40 Gbytes in capacity. The HDD 51 is accommodated inside the main unit 2 so as to be accommodated in a case 60, made of resin. The case 60 and the HDD 51 supported by the case 60 are provided in the space S. That is, the case 60 and the HDD 51 supported by the case 60 are provided below the keyboard 13 and closer to the side wall 10d.

As shown in FIGS. 5 to 8, the case 60 has a rectangular top wall 60a, paired side walls 60b and 60c, paired end walls 60d and 60e, and paired flange portions 60f and 60g. The bottom of the case 60 is open.

The top wall 60a has one or more, for example, six hole portions 61. The hole portions 61 function as lightening holes in order to reduce the weight of the case 60. The top wall 60a has ribs 62 on an outer surface (that is, a top surface) in order to receive the keyboard 13. The ribs 62 are provided on a peripheral portion of the outer surface of the top wall 60a and on opening edges of the hole portions 61.

An extended portion 63 extended in a longitudinal direction is provided at a corner portion 73 corresponding to one end of the top wall 60a and one end of one 60b of the side walls. The top wall 60a has a notch portion 64 at the other end. The paired end portions 60d and 60e have notch portions 65 and 66, respectively, the bottom of which is open. The notch portion 64 in the top wall 60a connects to the notch portion 65, formed in at one 60d of the end walls.

Figure 5:
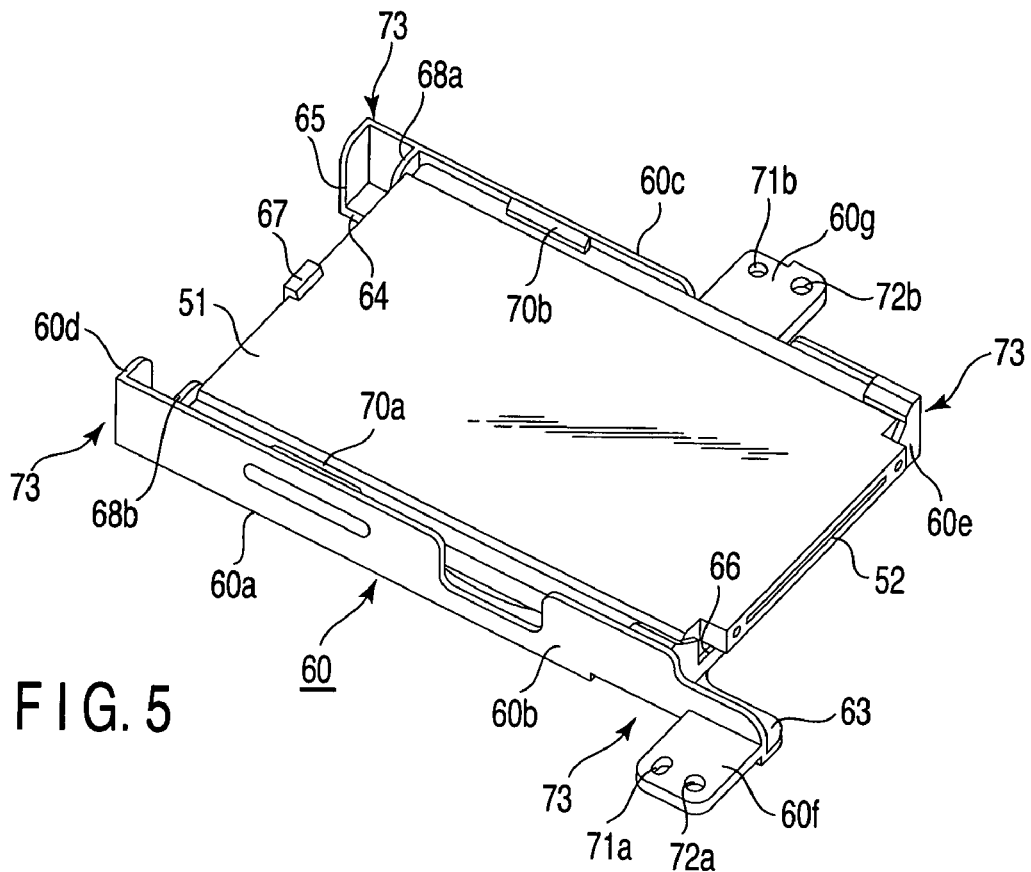
FIG. 5 is a perspective view of the HDD, provided in the portable computer in FIG. 1, and the case, supporting the HDD, as viewed from the bottom of the computer.
Figure 6:
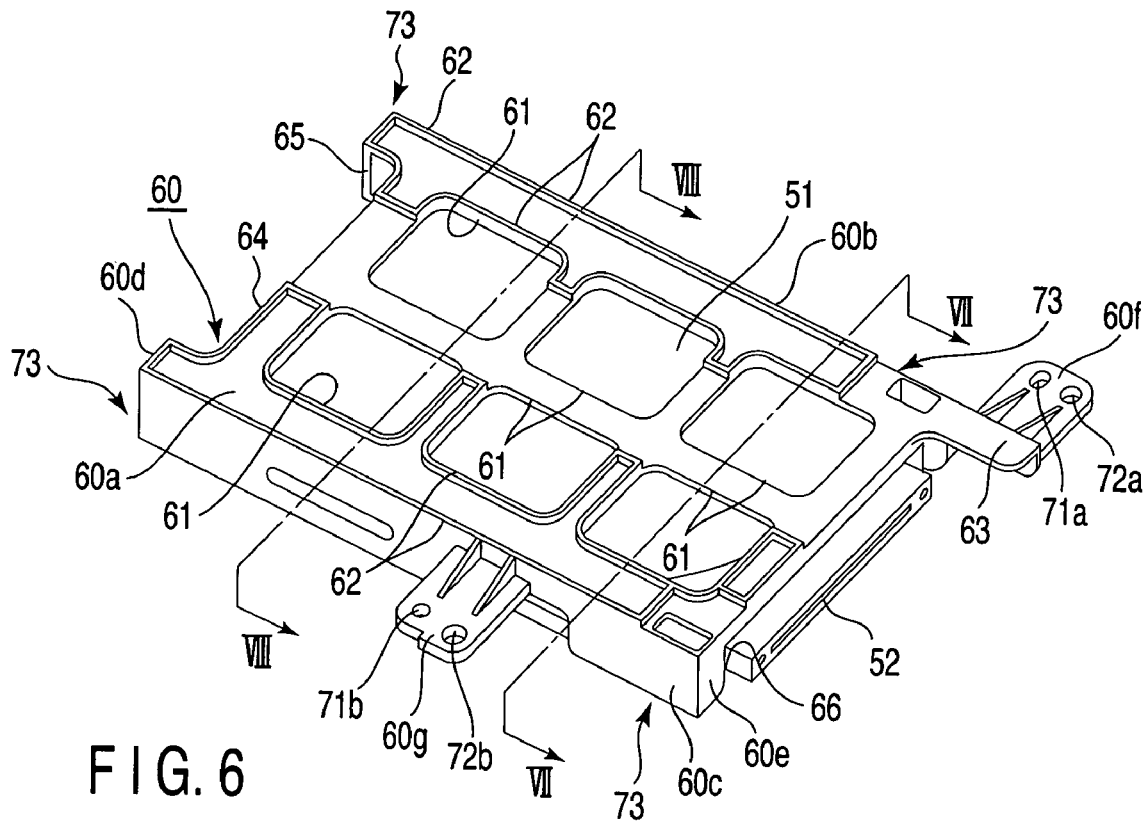
FIG. 6 is a perspective view of the HDD, provided in the portable computer in FIG. 1, and the case, supporting the HDD, as viewed from the top of the computer.

As shown in FIG. 5, a first paw portion 67 extended downward is formed on the notch portion 64 in the top wall 60a. The first paw portion 67 engages with a bottom surface of the HDD 51 so as to sandwich the HDD 51 between the case and the first paw portion 67. Abutting walls 68a and 68b extended toward the first paw portion 67 (in the direction of a central axis of the HDD 51 along its longitudinal direction) project from inner surfaces of the paired side walls 60b and 60c, respectively.

Figure 7:
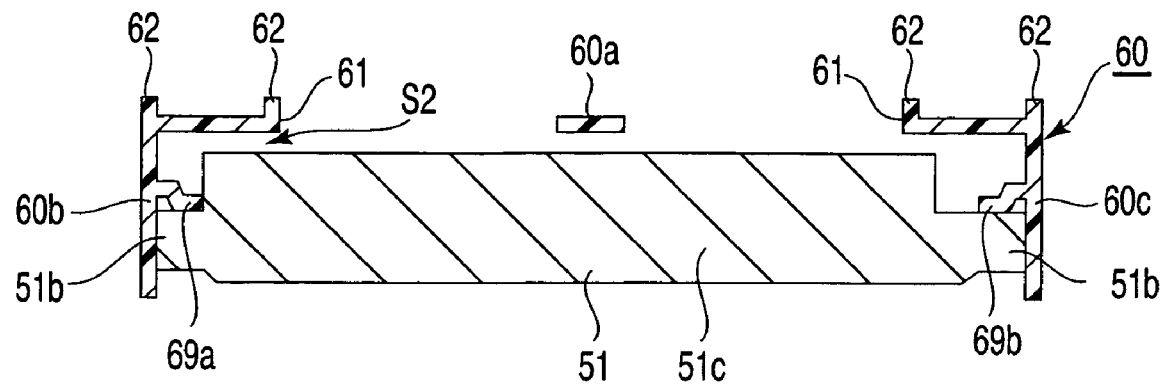
FIG. 7 is a sectional view taken along a line VII—VII in FIG. 6.
Figure 8:
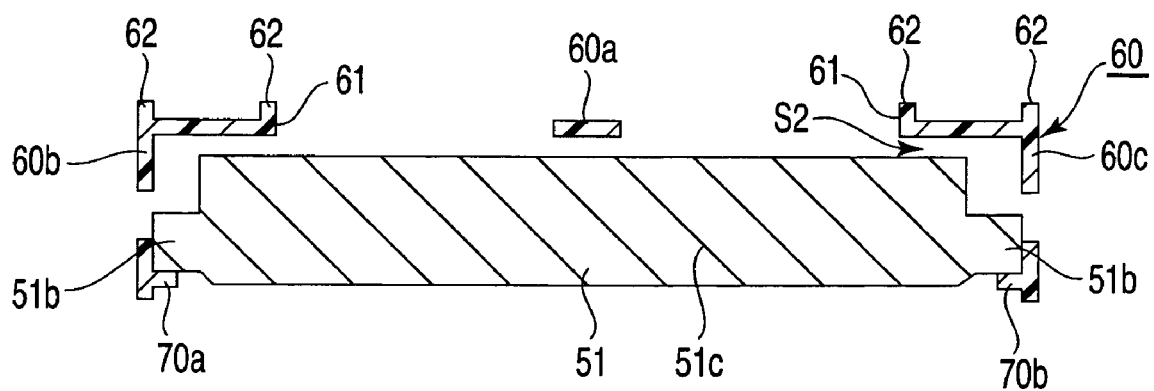
FIG. 8 is a sectional view taken along a line VIII—VIII in FIG. 6.

As shown in FIG. 7, paired paw portions (hereinafter referred to as second paw portions) 69a and 69b project from the inner surfaces of the paired side walls 60b and 60c, respectively, to removably hold a top surface of the HDD 51. As shown in FIG. 8, paired paw portions (hereinafter referred to as third paw portions) 70a and 70b project from the inner surfaces of the paired side walls 60b and 60c, respectively, to hold the bottom surface of the HDD 51. The second and third paw portions 69a, 69b, 70a, and 70b hold the HDD 51 so that the HDD 51 does not contact with the top wall 60a of the case 60.

The HDD 51 is sandwiched between the other end wall 60e and the abutting walls 68a and 68b and is supported by the case 60 so as to be held by the first to third paw portions 67, 69a, 69b, 70a, and 70b. The HDD 51 is sandwiched between the end wall 60e and the abutting walls 68a and 68b to restrict its movement in its longitudinal direction. The pared flange portions 51b of the HDD 51 are sandwiched between the second paw portions 69a and the third paw portion 70a and between the second paw portions 69b and the third paw portion 70b to restrict the movement of the HDD 51 in its width direction. Further, the first paw portion 67 engages with the bottom surface of the HDD 51 to supplement the support of the HDD 51 by the case 60.

The HDD 51 comprises a connector (hereinafter referred to as an HDD connector) 52 that electrically connects the HDD 51 to the printed circuit board 50. The HDD 51 is held in the case 60 in such a way that the HDD connector 52 is projected out of the notch portion 32 in the other end wall 60e. That is, the HDD connector 52 is exposed from the case 60.

The thickness of the HDD 51 varies with its storage capacity. The HDD 51, which is 1.8 inches in size and 40 Gbytes in capacity, comprises the paired flange portions 51b. A main body portion 51c between the paired flange portions 51b is formed to be thicker than the flange portions 51b. In contrast, an HDD having a size of 1.8 inches and a capacity of 20 Gbytes (not shown) is formed to be substantially as thick as the flange portions 51b of the HDD 51, which is 1.8 inches in size and 40 Gbytes in capacity. The case 60 is formed to hold the HDD 51, which is 1.8 inches in size and 40 Gbytes in capacity, by sandwiching the flange portions 51b of the HDD 51 between the second paw portion 69a and the third paw portion 70a and between the second paw portion 69b and the third paw portion 70b. Thus, the case 60 enables the holding of not only the HDD 51, which is 1.8 inches in size and 40 Gbytes in capacity, but also an HDD having a size of 1.8 inches and a capacity of 20 Gbytes.

The paired flange portions 60f and 60g are extended outward from the opposite sides of the case 60. Specifically, one 60f of the flange portions is extended outward from an outer surface of the extended portion 63 in a horizontal direction. The flange portion 60f has a first hole portion 71a penetrated by the first convex portion 34a and a first threaded hole 72a penetrated by a screw 36a (see FIG. 2) screwed into the first boss 35a. The other flange portion 60g is extended outward from an outer surface of the side wall 10c in the horizontal direction. The flange portion 60g has a second hole portion 71b penetrated by the second convex portion 34b and a second threaded hole 72b penetrated by a screw 36b (see FIG. 2) screwed into the second boss 35b.

The HDD 51 and the case 60 supporting the HDD 51 are accommodated inside the first housing 10 in such a way that the first and second convex portions 34a and 34b penetrate the first and second hole portions 71a and 71b, respectively. The case 60 is positioned relative to the first housing 10 by being supported by the convex portions 34a and 34b. Correspondingly, the HDD 51 is positioned so that the HDD connector 52 lies opposite the side wall 10d of the first housing 10.

The case 60 is fixed to the first housing 10 by screwing the screws 36a and 36b into the bosses 35a and 35b, respectively, the screws 36a and 36b having penetrated the first and second threaded holes 72a and 72, respectively. Accordingly, simply removing the screws 36a and 36b enables the easy removal, from the first housing 10, of the case 60 and the HDD 51 supported by the case 60.

The bottom wall 10f of the first housing 10 has the bent portion 33 as described above. Thus, the case 60 accommodated in the first housing 10 is sandwiched between the bottom wall 10f and the keyboard 13 at the four corner portions 73. FIG. 3 shows only two of the four corner portions 73 of the case 60, but the two other corner portions 73, which are not shown, are also sandwiched between the bottom wall 10f and the keyboard 13. Accordingly, a gap S1 is formed between the bottom wall 10f of the first housing 10 and the HDD 51. Further, as described above, the HDD 51 does not contact with the top wall 60a of the case 60. Accordingly, a gap S2 is formed between the top wall 60a of the case 60 and the HDD 51.

Thus, the gap S1 is formed between the bottom wall 10f of the first housing 10 and the HDD 51. The gap S2 is formed between the top wall 60a of the case 60 and the HDD 51. Therefore, even if a shock is inputted to the first housing 10, this external shock is unlikely to be transmitted to the HDD 51.

Furthermore, the HDD 51 is located below the keyboard 13, so that a shock that may occur when the keyboard 13 is operated is likely to be transmitted to the HDD 51. Thus, in the portable computer 2, the gap S2 is formed between the top wall 60a of the case 60 and the HDD 51. Accordingly, a shock that may occur when the keyboard 13 is operated is hindered from being transmitted to the HDD 51. Further, the keyboard 13 can be favorably supported by the ribs 62.

Moreover, the case 60 is made of resin. Thus, even if a shock inputted to the first housing 10 or a shock occurring when the keyboard 13 is operated is transmitted to the case 60 via the ribs 62 or the corner portions 73, the case 60 is flexed to favorably absorb the shock. Therefore, external shocks are unlikely to be transmitted to the HDD 51.

As shown in FIGS. 2 to 4, the first cable 54 is extended from the printed circuit board 50. The first cable 54 is thin like a film and flexible. The first cable 54 is provided with the first connector 53 at its tip, which can be electrically and mechanically connected to the HDD connector 52.

Further, the second cable 56 is extended from the printed circuit board 50. Like the first cable 54, the second cable 56 is thin like a film and flexible. The second cable 56 has one or more, for example, two independent wires (not shown). The second cable 56 has two second connectors 55 provided at its tip and connected to the respective wires.

As shown in FIG. 2, the second connectors 55 are mounted in parallel opposite the side wall 10d of the first housing 10. The side wall 10d has two openings 15 formed in parallel opposite the respective second connectors 55 and from which the respective second connectors 55 are exposed.

The first cable 54 is extended through the gap S1 between the bottom wall 10f of the first housing 10 and the HDD 51 toward the side wall 10d of the first housing 10. The first connector 53, provided at the tip of the first cable 54, is electrically and mechanically connected to the HDD connector 52. Thus, since the gap S1 is formed between the bottom wall 10f of the first housing 10 and the HDD 51, the first cable 54 is extended toward the HDD connector 52 without forming any space in which the first cable 54 is wired.

The HDD 51 is positioned relative to the first housing 10. Thus, the HDD connector 52 has no degree of freedom. However, since the first cable 54 is flexible, the first connector 53 has a degree of freedom in three-dimensional directions. Accordingly, the first cable 54 absorbs the misalignment between the HDD connector 52 and the first connector 53. Even if the HDD 51 is fixed to the first housing 10, the HDD connector 52 and the first connector 53 can be easily aligned with each other. After the HDD connector 52 and the first connector 53 have been connected together, the first connector 53 may be fixed to the bottom wall 10f of the first housing 10 or the like using screws or the like.

The second cable 56 is also extended through the gap S1 between the bottom wall 10f of the first housing 10 and the HDD 51 toward the side wall 10d of the first housing 10. The two second connectors 55, provided at the tip of the second cable 56, are exposed from the first housing 10 via the respective openings 15. Thus, since the gap S1 is formed between the bottom wall 10f of the first housing 10 and the HDD 51, the second cable 56 can be wired without forming any space in which the second cable 56 is wired. Further, since the second cable 56 is flexible, the second connector 55 and the opening 22 can be easily aligned with each other.

According to the portable computer 1, described above, the gaps S1 and S2 are formed between the bottom wall 10f of the first housing 10 and the HDD 51 and between the top wall 60a of the case 60 and the HDD 51, respectively. The flexible first connector 53 passes through the gap S1 between the bottom wall 10f of the first housing 10 and the HDD 51. It is thus difficult to transmit shocks to the HDD 51. Further, the HDD 51 and the first connector 53 can be easily aligned with each other.

Furthermore, the gap S2 is formed between the top wall 60a of the case 60 and the HDD 51. This structure makes it difficult to transmit shocks to the HDD 51. This enables the HDD 51 to be placed below the keyboard 13 while hindering the HDD 51 from malfunctioning or being damaged.

Moreover, the corner portions 73 of the case 60 are sandwiched between the bottom wall 10f and the keyboard 13. This reduces the amount of contact between the case 60 and the first housing 10. Therefore, it is possible to hinder shocks inputted to the first housing 10 from being transmitted to the case 60. Further, the four corner portions 73 of the case 60 are stronger than the other portions of the case 60. Thus, by sandwiching the four corner portions 73 of the case 60 between the bottom wall 10f and the keyboard 13, the HDD 51 can be favorably protected even with inputted shocks. Furthermore, the first housing 10 can support the keyboard 13 from below while maintaining the pressure intensity of the keyboard 13.

The case 60 also has the ribs 62 on the outer surface of the top wall 60a to receive the keyboard 13. Therefore, the ribs 62 can support the keyboard 13.

The case 60 further has the hole portions 61 in its top wall 60. This serves to reduce the weight of the case 60. Further, since each rib 62 is provided on the opening edges of the hole portions 61, it is possible to support the keyboard 13 using the ribs 62, while reducing the weight of the case 60.

The bottom of the case 60 is open. This serves to reduce the weight of the case 60. Further, the gap S1 is formed between the bottom wall 10f of the first housing 10 and the HDD 51. Thus, even though the bottom of the case 60 is open, it is difficult to transmit shocks inputted from the bottom wall 10f directly to the HDD 51.

Additionally, since the case 60 is made of resin, even if a shock inputted to the first housing is transmitted to the case 60, the case 60 is flexed to absorb the shock. This enables the HDD 51 to be favorably protected.

Moreover, the case 60 is provided with the paw portions 69a, 69b, 70a, and 70b on its side walls 60b and 60c to removably hold the HDD 51. This enables the case 60 to hold the HDD 51 with the gap S2 formed between the top wall 60a of the case 60 and the HDD 51.

Like the first cable 54, the second cable 56 passes through the gap S1 between the bottom wall 10f of the first housing 10 and the HDD 51. Since the gap S1 is thus formed between the bottom wall 10f of the first housing 10 and the HDD 51, when the second connector 55 for a connection to an expansion apparatus is provided on the first housing 10, the second cable 56, connected to the second connectors 55, can be extended toward the opening 15.

In the present embodiment, the HDD 51 is placed below the keyboard 13. However, the HDD 51 may be located below the palm rest 11. This makes it difficult to transmit, to the HDD 51, an external shock inputted to the first housing, a shock that may occur when the user's hand is placed on the palm rest, or other shocks. Further, the HDD 51 and the first connector 53 can be easily aligned with each other.

The storage device is not limited to the HDD but is widely applicable to general storage devices. Further, the electronic apparatus according to the present invention is not limited to the portable computer. It is widely applicable to various electronic apparatuses such as an electronic notebook and a PDA which comprise a storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a housing having a bottom wall and convex portions projecting upward from the bottom wall;
   a case having a top wall and accommodated inside the housing while being supported by the convex portions;
   a storage device supported by the case;
   a first cable having a first connector connected to the storage device;
   a second connector different from the first connector;
   a second cable connected to the second connector;
   wherein gaps are formed between the bottom wall of the housing and the storage device and between the top wall of the case and the storage device, respectively, and
   wherein the first and second cables pass through the gap between the bottom wall of the housing and the storage device.

2. The electronic apparatus according to claim 1, wherein the housing includes a top wall located opposite the bottom wall, a keyboard attached to the top wall, and the storage device is located below the keyboard.

3. The electronic apparatus according to claim 1, wherein the housing includes a top wall located opposite the bottom wall, a palm rest provided on an outer surface of the top wall, and the storage device is located below the palm rest.

4. The electronic apparatus according to claim 1, wherein a bottom of the case is open.

5. The electronic apparatus according to claim 1, wherein the case comprises a resin material.

6. The electronic apparatus according to claim 1, wherein the case has paired side walls located opposite each other across the storage device, and the paired side walls have paw portions that removably hold the storage device.

7. The electronic apparatus according to claim 2, wherein the case has corner portions, and the corner portions are sandwiched between the bottom wall and the keyboard.

8. The electronic apparatus according to claim 2, wherein the case includes ribs on the outer surface of the top wall to receive the keyboard.

9. The electronic apparatus according to claim 8, wherein the case has hole portions in the top wall, and each rib is provided on opening edges of the hole portions.

* * * * *